US012400319B2

(12) United States Patent
Ofir et al.

(10) Patent No.: US 12,400,319 B2
(45) Date of Patent: Aug. 26, 2025

(54) DEFECT EXAMINATION ON A SEMICONDUCTOR SPECIMEN

(71) Applicant: Applied Materials Israel Ltd., Rehovot (IL)

(72) Inventors: Yehonatan Hai Ofir, Rehovot (IL); Yehonatan Ridelman, Gan-Yavne (IL); Ran Badanes, Rishon LeZion (IL); Boris Sherman, Rehovot (IL); Boaz Cohen, Lehavim (IL)

(73) Assignee: Applied Materials Israel Ltd., Rehovot (IL)

( * ) Notice: Subject to any disclaimer, the term of this patent is extended or adjusted under 35 U.S.C. 154(b) by 417 days.

(21) Appl. No.: 17/903,262

(22) Filed: Sep. 6, 2022

(65) Prior Publication Data

US 2024/0078659 A1  Mar. 7, 2024

(51) Int. Cl.
*G06T 7/30* (2017.01)
*G06T 5/70* (2024.01)
*G06T 5/77* (2024.01)
*G06T 7/00* (2017.01)

(52) U.S. Cl.
CPC ............... *G06T 7/001* (2013.01); *G06T 5/70* (2024.01); *G06T 5/77* (2024.01); *G06T 7/30* (2017.01); *G06T 2207/20081* (2013.01); *G06T 2207/20084* (2013.01); *G06T 2207/30148* (2013.01)

(58) Field of Classification Search
CPC .. G06T 7/001; G06T 5/70; G06T 5/77; G06T 7/30; G06T 2207/20081; G06T 2207/20084; G06T 2207/30148; G06T 2207/10024; G06T 2207/10061; G06T 2207/20076; G06N 3/0455; G06N 3/0464;

(Continued)

(56) References Cited

U.S. PATENT DOCUMENTS 10,395,362 B2 * 8/2019 Gupta ................... G06N 3/08
11,042,981 B2 * 6/2021 Adler ............... H01L 21/67288
2022/0254145 A1 * 8/2022 Yang .................... G06V 10/776

(Continued)

OTHER PUBLICATIONS

Abu Ebayyeh, Abd Al Rahman M. Deep learning for automatic optical inspection and quality evaluation of semiconductor and optoelectronic manufacturing. Diss. Brunel University London, 2022. (Year: 2022).*

(Continued)

*Primary Examiner* — Gregory A Morse
*Assistant Examiner* — Renae A Bitor
(74) *Attorney, Agent, or Firm* — Lowenstein Sandler LLP

(57) ABSTRACT

There is provided a system and method for defect examination on a semiconductor specimen. The method comprises obtaining a runtime image of the semiconductor specimen, generating a reference image based on the runtime image using a machine learning (ML) model, and performing defect examination on the runtime image using the generated reference image. The ML model is previously trained during setup using a training set comprising one or more pairs of training images, each pair including a defective image and a corresponding defect-free image. The training comprises, for each pair, processing the defective image by the ML model to obtain a predicted image, and optimizing the ML model to minimize a difference between the predicted image and the defect-free image.

18 Claims, 3 Drawing Sheets

(58) Field of Classification Search
CPC .......... G06N 3/088; G06N 3/09; G06N 20/00; G06V 10/774
See application file for complete search history.

(56) References Cited

U.S. PATENT DOCUMENTS

2023/0054119 A1* 2/2023 Pai .......................... G06T 7/001
2024/0193760 A1* 6/2024 Fukuda ................... H01L 22/00

OTHER PUBLICATIONS

Kim, Minsu, et al. "Weakly-supervised defect segmentation on periodic textures using CycleGAN." IEEE Access 8 (2020): 176202-176216. (Year: 2020).*
Zavrtanik, et al., "Reconstruction by inpainting for visual anomaly detection," 2020, pp. 1-9, Faculty of Computer and Information Science, University of Ljubljana, Vecna pot 113, Ljubljana 1000, Slovenia.

* cited by examiner

DEFECT EXAMINATION ON A SEMICONDUCTOR SPECIMEN

TECHNICAL FIELD

The presently disclosed subject matter relates, in general, to the field of examination of a semiconductor specimen, and more specifically, to defect detection on a semiconductor specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Run-time examination can generally employ a two-phase procedure, e.g., inspection of a specimen followed by review of sampled locations of potential defects. Examination generally involves generating certain output (e.g., images, signals, etc.) for a specimen by directing light or electrons to the wafer, and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having high probability of being a defect. During the second phase, at least some of the suspected locations are more thoroughly analyzed with relatively high resolution, for determining different parameters of the defects, such as classes, thickness, roughness, size, and so on.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc. Automated examination systems ensure that the parts manufactured meet the quality standards expected and provide useful information on adjustments that may be needed to the manufacturing tools, equipment, and/or compositions, depending on the type of defects identified.

In some cases, machine learning technologies can be used to assist the examination process so as to provide accurate and efficient solutions for automating specific examination applications and promote higher yield.

SUMMARY

In accordance with certain aspects of the presently disclosed subject matter, there is provided a computerized system for defect examination on a semiconductor specimen, the system comprising a first processing and memory circuitry (PMC) configured to obtain a runtime image of the semiconductor specimen; generate a reference image based on the runtime image using a machine learning (ML) model; and perform defect examination on the runtime image using the generated reference image; wherein the ML model is previously trained during setup using a training set comprising one or more pairs of training images, each pair including a defective image and a corresponding defect-free image, the training comprising, for each pair: processing the defective image by the ML model to obtain a predicted image; and optimizing the ML model to minimize a difference between the predicted image and the defect-free image.

In addition to the above features, the system according to this aspect of the presently disclosed subject matter can comprise one or more of features (i) to (xi) listed below, in any desired combination or permutation which is technically possible:

(i). The ML model is a deep neural network (DNN) configured to learn non-linear mapping between two populations of defective images and defect-free images.

(ii). The defective image in each pair is one of an actual image of the semiconductor specimen acquired by an examination tool and verified as containing a defective feature, or a simulated image by synthetically implanting a defective feature on a defect-free image.

(iii). The corresponding defect-free image in each pair is one of an actual image of the semiconductor specimen acquired by an examination tool and verified as not containing a defective feature, or a simulated image generated based on design data of the semiconductor specimen.

(iv). The defective image and the defect-free image in each pair are pre-processed before the training by registering the defective image and the defect-free image to correct misalignment therebetween.

(v). The defective image and the defect-free image in each pair are pre-processed before the training by performing noise filtration on the defective image and the defect-free image to reduce noises representative of variations caused by one or more physical processes of the specimen.

(vi). The defective image and the defect-free image in each pair are pre-processed before the training by performing image augmentation on the defective image and the defect-free image using inpainting, giving rise to multiple defective sub-images corresponding to respective portions of the defect-free image.

(vii). The defective image and the defect-free image in each pair are pre-processed before the training by performing image registration, noise filtration and image augmentation on the defective image and the defect-free image.

(viii). The ML model comprises at least one learning module preceding a DNN, and the at least one learning module is trained to perform at least one of image registration and noise filtration on the defective image and the defect-free image in each pair before being processed by the DNN.

(ix). The ML model is optimized using a loss function selected from Mean squared error (MSE), Sum of absolute difference (SAD), structural similarity index measure (SSIM), and an edge-preserving loss function.

(x). The defect examination is one of defect detection, defect review, and defect classification.

(xi). The generated reference image has improved alignment with the runtime image and shares similar noise levels as of the runtime image, and the PMC is configured to perform defect examination by directly comparing the runtime image with the generated reference image to obtain a defect examination result indicative of defect distribution on the semiconductor specimen.

In accordance with other aspects of the presently disclosed subject matter, there is provided a computerized method for examining a semiconductor specimen, the method comprising: obtaining a runtime image of the semiconductor specimen; generating a reference image based on the runtime image using a machine learning (ML) model; and performing defect examination on the runtime image using the generated reference image; wherein the ML model is previously trained during setup using a training set comprising one or more pairs of training images, each pair including a defective image and a corresponding defect-free image, the training comprising, for each pair: processing the defective image by the ML model to obtain a predicted image; and optimizing the ML model to minimize a difference between the predicted image and the defect-free image.

This aspect of the disclosed subject matter can comprise one or more of features (i) to (xi) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a computerized method for examining a semiconductor specimen, the method comprising: obtaining a runtime image of the semiconductor specimen; generating a reference image based on the runtime image using a machine learning (ML) model; and performing defect examination on the runtime image using the generated reference image; wherein the ML model is previously trained during setup using a training set comprising one or more pairs of training images, each pair including a defective image and a corresponding defect-free image, the training comprising, for each pair: processing the defective image by the ML model to obtain a predicted image; and optimizing the ML model to minimize a difference between the predicted image and the defect-free image.

This aspect of the disclosed subject matter can comprise one or more of features (i) to (xi) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
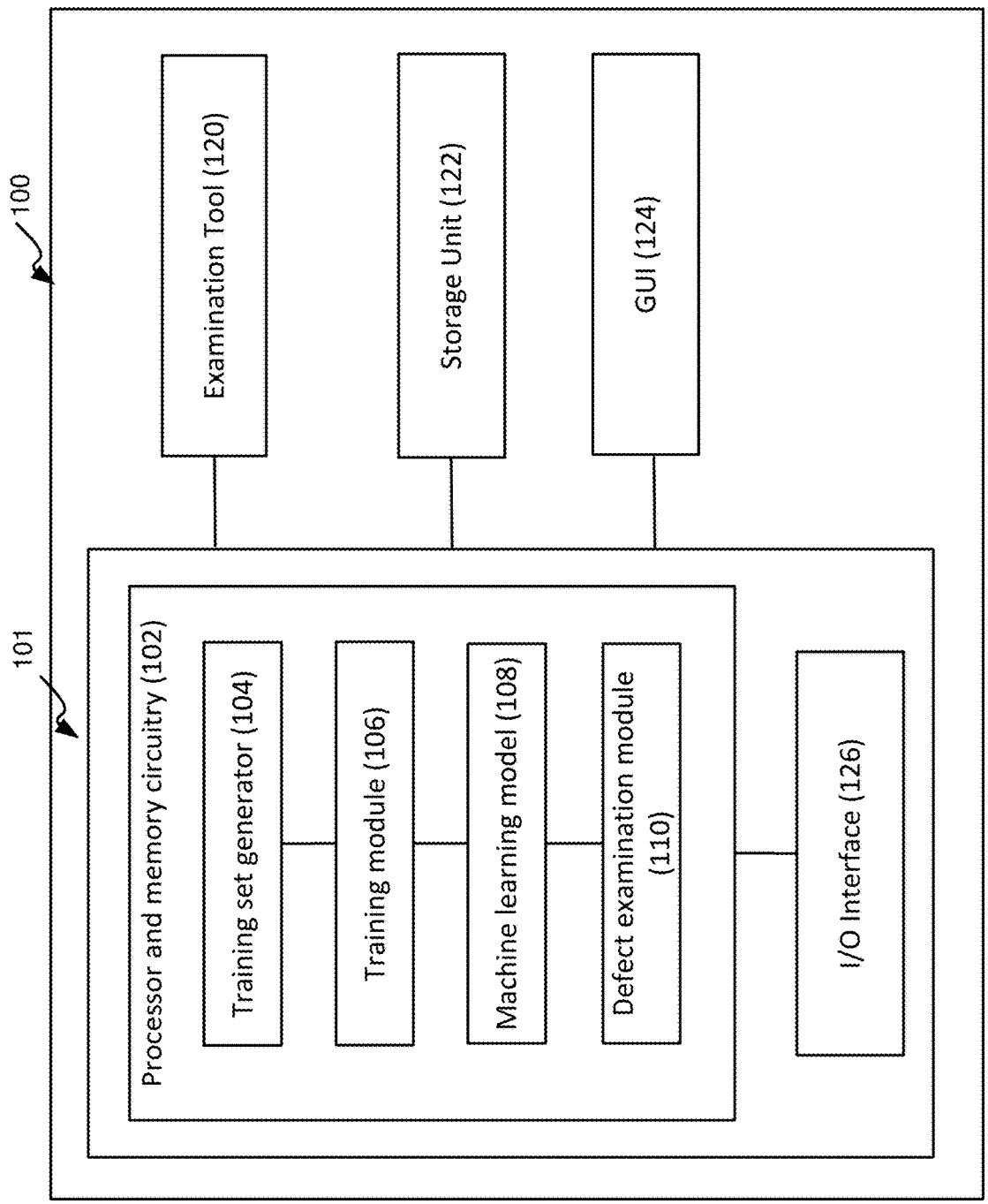
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "examining", "generating", "learning", "training", "processing", "optimizing", "performing", "pre-processing", "registering", "filtering", "inpainting", "using", "comparing", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the training system for training a ML model, the runtime defect examination system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "defect candidate" used in this specification should be expansively construed to cover a suspected defect location on the specimen which is detected to have relatively high probability of being a defect of interest (DOI). Therefore, a defect candidate, upon being reviewed/tested, may actually be a DOI, or, in some other cases, it may be a nuisance as described above, or random noise that can be caused by different variations (e.g., process variation, color variation, mechanical and electrical variations, etc.) during inspection.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

The process of semiconductor manufacturing often requires multiple sequential processing steps and/or layers, each one of which could possibly cause defects that may lead to yield loss. Defect examination operations, such as defect detection, defect review and defect classification, etc., can be performed at various processing steps/layers during the manufacturing process to monitor and control the process.

Various detection methods can be used for detecting defects on specimens. By way of example, a classic die-to-reference detection algorithm, such as, e.g., Die-to-Die (D2D), is typically used. In D2D, an inspection image of a target die is captured. For purpose of detecting defects in the inspection image, one or more reference images are captured from one or more reference dies (e.g., one or more neighboring dies) of the target die. The inspection image and the reference images are aligned and compared to each other. One or more difference images can be generated based on the difference between pixel values of the inspection image, and pixel values derived from the one or more reference images. A detection threshold is then applied to the difference maps, and a defect map indicative of defect candidates in the target die is created.

There are certain disadvantages with respect to the above-described die-to-reference detection methods. For example, the D2D method requires the acquisition of at least two images (i.e., in cases of one inspection image and one reference image) which doubles the image acquisition time of the inspection tool. In cases of using multiple references, it significantly increases the image acquisition time in accordance with the number of reference images. In addition, prior to comparison, the inspection image and reference images need to be registered. In some cases, they need additional pre-processing in order to compensate for noises representing the variations (such as, e.g., process variation and color variations) between the two images. These unavoidably increase the processing time of the detection methods, thus affect detection throughput (TpT). In addition, the detection sensitivity may also be affected due to the residual variations and noises which were not eliminated by the pre-processing.

Accordingly, certain embodiments of the presently disclosed subject matter propose to generate a synthetic reference image using a machine learning model instead of additional acquisition of an actual reference image, and use the generated reference image to perform defect examination operations in runtime. The proposed runtime examination system significantly reduces the image acquisition time of the tool and eliminates image pre-processing efforts such as image registration and noise filtration, thereby improving detection throughput and defect detection sensitivity, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect review, defect classification, segmentation, and/or metrology operations, such as, e.g., critical dimension (CD) measurements, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning (in a single or in multiple scans), imaging, sampling, reviewing, measuring, classifying and/or other processes provided with regard to the specimen or parts thereof. Without limiting the scope of the disclosure in any way, it should also be noted that the examination tools 120 can be implemented as machines of various types, such as optical machines, electron beam machines (e.g., Scanning Electron Microscope (SEM), Atomic Force Microscopy (AFM), or Transmission Electron Microscope (TEM), etc.), and so on.

The one or more examination tools 120 can include one or more inspection tools and/or one or more review tools. In some cases, at least one of the examination tools 120 can be an inspection tool configured to scan a specimen (e.g., an entire wafer, an entire die, or portions thereof) to capture inspection images (typically, at a relatively high-speed and/or low-resolution) for detection of potential defects (i.e., defect candidates). During inspection, the wafer can move at a step size relative to the detector of the inspection tool (or the wafer and the tool can move in opposite directions relative to each other) during the exposure, and the wafer can be scanned step-by-step along swaths of the wafer by the inspection tool, where the inspection tool images a part/portion (within a swath) of the specimen at a time. By way of example, the inspection tool can be an optical inspection tool. At each step, light can be detected from a rectangular portion of the wafer and such detected light is converted into multiple intensity values at multiple points in the portion, thereby forming an image corresponding to the part/portion of the wafer. For instance, in optical inspection, an array of parallel laser beams can scan the surface of a wafer along the swaths. The swaths are laid down in parallel rows/columns contiguous to one another to build up, swath-at-a-time, an image of the surface of the wafer. For instance, the tool can scan a wafer along a swath from up to down, then switch to the next swath and scan it from down to up, and so on and so forth, until the entire wafer is scanned and inspection images of the wafer are collected.

In some cases, at least one of the examination tools 120 can be a review tool, which is configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). By way of example, the review tool can be an electron beam tool, such as, e.g., scanning electron microscopy (SEM), etc. SEM is a type of electron microscope that produces images of a specimen by scanning the specimen with a focused beam of electrons. The electrons interact with atoms in the specimen, producing various signals that contain information on the surface topography and/or composition of the specimen. SEM is capable of accurately inspecting and measuring features during the manufacture of semiconductor wafers.

The inspection tool and review tool can be different tools located at the same or at different locations, or a single tool operated in two different modes. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools. In some cases, at least one of the examination tools 120 has metrology capabilities and can be configured to capture images and perform metrology operations on the captured images. Such an examination tool is also referred to as a metrology tool.

It is to be noted that the term images in either "runtime image(s)", "reference image(s)" or "training image(s)" used herein can refer to original images of the specimen captured by the examination tool during the manufacturing process, derivatives of the captured images obtained by various pre-processing stages, and/or computer-generated synthetic images (in some cases based on design data). It is to be noted that in some cases the images referred to herein can include image data (e.g., captured images, processed images, etc.) and associated numeric data (e.g., metadata, hand-crafted attributes, etc.). It is further noted that image data can include data related to one or more of the following: a processing step of interest, a layer of interest, a plurality of processing steps, and/or a plurality of layers of the specimen.

According to certain embodiments of the presently disclosed subject matter, the examination system 100 comprises a computer-based system 101 operatively connected to the examination tools 120 and capable of automatic defect examination on a semiconductor specimen in runtime based on runtime images obtained during specimen fabrication. System 101 is also referred to as a defect examination system.

Specifically, system 101 includes a processor and memory circuitry (PMC) 102 operatively connected to a hardware-based I/O interface 126. The PMC 102 is configured to provide processing necessary for operating the system, as further detailed with reference to FIGS. 2-3, and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

According to certain embodiments of the presently disclosed subject matter, system 101 can be a runtime defect examination system configured to perform defect examination operations using a trained machine learning (ML) model based on runtime images obtained during specimen fabrication. In such cases, one or more functional modules comprised in the PMC 102 of system 101 can include a machine learning (ML) model 108 that was previously trained for generating a reference image, and a defect examination module 110.

Specifically, the PMC 102 can be configured to obtain, via an I/O interface 126, a runtime image of the semiconductor specimen, and provide the runtime image as an input to a machine learning model (e.g., the ML model 108) to process. The ML model 108 can generate a reference image based on the runtime image. The ML model 108 is previously trained during setup using a training set comprising one or more pairs of training images, each pair including a defective image and a corresponding defect-free image. The defect examination module 110 can be configured to perform defect examination on the runtime image using the generated reference image.

In such cases, the ML model 108 and defect examination module 110 can be regarded as part of a defect examination recipe usable for performing runtime defect examination operations on acquired runtime images. System 101 can be regarded as a runtime defect examination system capable of performing runtime defect-related operations using the defect examination recipe. Details of the runtime examination process are described below with reference to FIGS. 3 and 5.

In some embodiments, system 101 can be configured as a training system capable of training the ML model during a training/setup phase using a specific training set. In such cases, one or more functional modules comprised in the PMC 102 of system 101 can include a training set generator 104, a training module 106, and a ML model 108. Specifically, the training set generator 104 can be configured to generate a training set comprising one or more pairs of training images, each pair including a defective image and a corresponding defect-free image. The training module 106 can be configured to train the ML model 108 using the training set. Specifically, the training can comprise processing the defective image by the ML model to obtain a predicted image, and optimizing the ML model to minimize a difference between the predicted image and the defect-free image.

As described above, the ML model, upon being trained, is usable for generating a reference image for a runtime image. Details of the training process are described below with reference to FIGS. 2 and 4.

Operation of systems 100 and 101, the PMC 102, and the functional modules therein will be further detailed with reference to FIGS. 2-3.

According to certain embodiments, the ML model 108 referred to herein can be implemented as various types of machine learning models, such as, e.g., decision tree, Support Vector Machine (SVM), Artificial Neural Network (ANN), regression model, Bayesian network, or ensembles/combinations thereof etc. The learning algorithm used by the ML model can be any of the following: supervised learning, unsupervised learning, or semi-supervised learning, etc. The presently disclosed subject matter is not limited to the specific type of ML model or the specific type or learning algorithm used by the ML model.

In some embodiments, the ML model can be implemented as a deep neural network (DNN). DNN can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a ML model can be initially selected prior to training, and can be further iteratively adjusted or modified during training to achieve an optimal set of weighting and/or threshold values in a trained model. A set of input data used to adjust the weights/thresholds of a ML model is referred to as a training set. Details of the training process are described below with reference to FIGS. 2 and 4.

It is noted that the teachings of the presently disclosed subject matter are not bound by specific architecture of the ML model or DNN as described above.

In some cases, additionally to system 101, the examination system 100 can comprise one or more examination modules, such as, e.g., additional defect detection module, Automatic Defect Review Module (ADR), Automatic Defect Classification Module (ADC), metrology-related module, and/or other examination modules which are usable for examination of a semiconductor specimen. The one or more examination modules can be implemented as stand-alone computers, or their functionalities (or at least part thereof) can be integrated with the examination tool 120. In some cases, the output of system 101 can be provided to the one or more examination modules (such as the ADR, ADC, etc.) for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120, such as, e.g., the runtime images, the training set, as described above. Accordingly, these input data can be retrieved from the storage unit 122 and provided to the PMC 102 for further processing. The output of the system 101, such as the generated reference image, and/or defect examination data, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the images of the specimen, etc. The user may be provided, through the GUI, with options of defining certain operation parameters. The user may also view the operation results or intermediate processing results, such as, e.g., the reference image, the defect examination data, etc., on the GUI. In some cases, system 101 can be further configured to send certain output to the storage unit 122, and/or external systems (e.g., Yield Management System (YMS) of a fabrication plant (FAB)).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system illustrated in FIG. 1 can be implemented in a distributed computing environment, in which the aforementioned components and functional modules shown in FIG. 1 can be distributed over several local and/or remote devices, and can be linked through a communication network. By way of example, the examination tool 120 and the system 101 can be located at the same entity (in some cases hosted by the same device) or distributed over different entities. By way of another example, as described above, in some cases, system 101 can be configured as a training system for training the ML model, while in some other cases, system 101 can be configured as a runtime defect examination system using the trained ML model. The training system and the runtime examination system can be located at the same entity (in some cases hosted by the same device), or distributed over different entities, depending on specific system configurations and implementation needs.

It is further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

Figure 2:
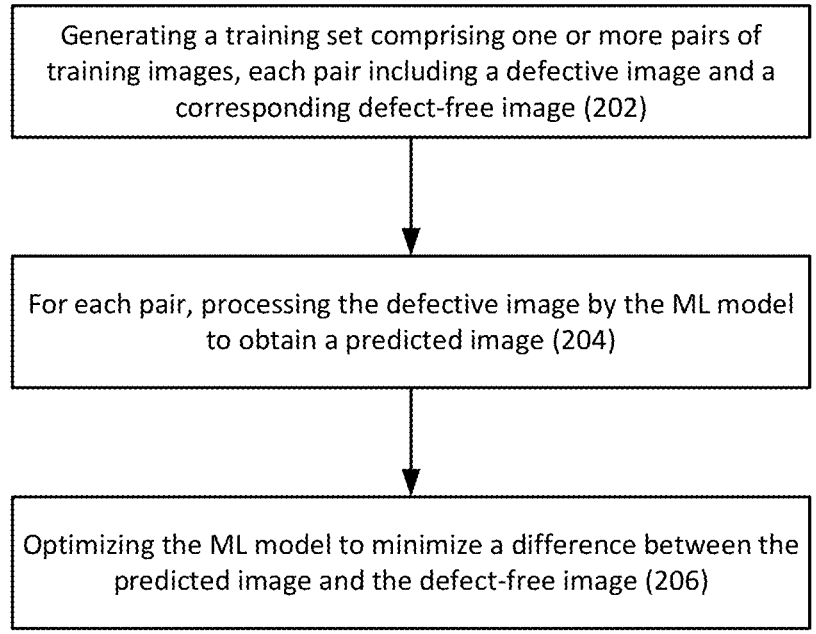
FIG. 2 illustrates a generalized flowchart of training a machine learning model usable for generating a reference image for a defective image of a semiconductor specimen in accordance with certain embodiments of the presently disclosed subject matter.
Figure 3:
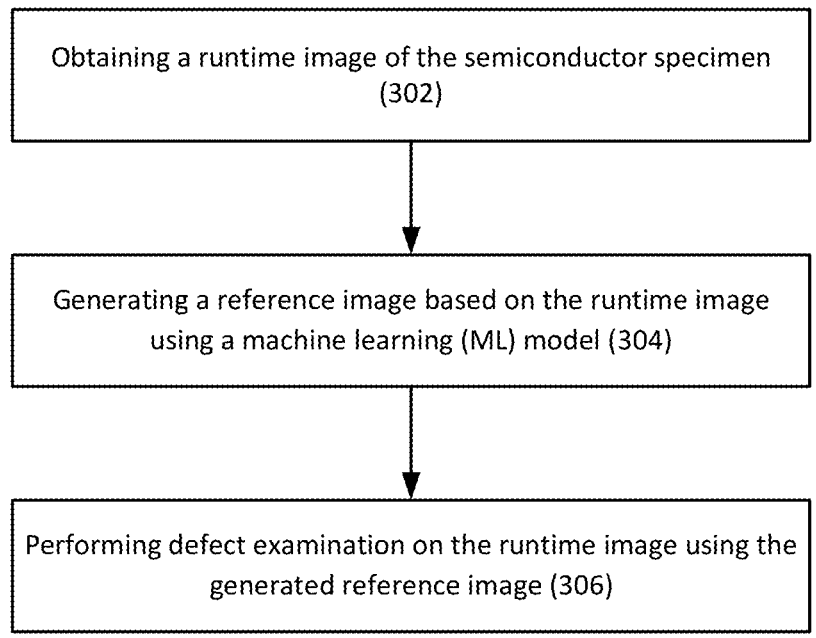
FIG. 3 is a generalized flowchart of runtime defect examination using a machine learning model trained for generating a reference image in accordance with certain embodiments of the presently disclosed subject matter.

While not necessarily so, the process of operation of systems 101 and 100 can correspond to some or all of the stages of the methods described with respect to FIGS. 2-3. Likewise, the methods described with respect to FIGS. 2-3 and their possible implementations can be implemented by systems 101 and 100. It is therefore noted that embodiments discussed in relation to the methods described with respect to FIGS. 2-3 can also be implemented, mutatis mutandis as various embodiments of the systems 101 and 100, and vice versa.

Referring to FIG. 2, there is illustrated a generalized flowchart of training a machine learning model usable for generating a reference image for a defective image of a semiconductor specimen in accordance with certain embodiments of the presently disclosed subject matter.

As described above, the ML model referred to herein can be implemented as various types of machine learning models. In some embodiments, the ML model can be trained based on supervised learning. Supervised learning generally refers to training a learning model on input data that has been labeled for a particular output. The model is trained until it can detect the underlying patterns and relationships between the input data and the output labels, enabling it to yield accurate labeling results when presented with runtime data which the model has never seen before. In such cases, the ML model can be implemented as various models, such as, e.g., Convolutional Neural Network (CNN), Support vector machine (SVM), decision trees, etc., with supervised learning mode.

For training a ML model in supervised learning, a labeled training set is required. According to certain embodiments of the present disclosure, a training set can be generated (202) (e.g., by the training set generator 104 in PMC 102), comprising one or more pairs of training images. Each pair includes a defective image and a corresponding defect-free image. A defective image used herein refers to an image that comprises, or has a high probability of comprising, defective features representative of actual defects on a specimen. A defect-free image refers to a clean image free of defective features, or has a high probability of not comprising any defective features. The defect-free image corresponds to the defective image in a sense that it captures a similar region containing similar patterns as of the defective image. The defect-free image serves as the ground truth data associated with the defective image in the same pair. The ML model is trained to learn the non-linear mapping relationship between the two populations of defective images and defect-free images.

In some cases, the training images, such as the defective image and the defect-free image in each pair, can be "real world" images (i.e., actual images) of a semiconductor specimen acquired by an examination tool during a fabrication process of the specimen. By way of example, the defective image can be an inspection image that the tool captures from an inspection area of a specimen, which is verified as containing a defective feature. For instance, the inspection image can be verified as a defective image containing a defective feature in a defect detection process (in which cases it is regarded as a defective image having high probability of containing a defective feature), or in a defect review process, e.g., either in a manual review by a user, or an automatic review by an ADR process. The defect-free image can be captured by the tool from one or more reference areas of the inspection area (such as, e.g., one or more neighboring dies of an inspection die in D2D inspection) which are known to be defect-free, or have a high probability of being defect-free. The defect-free image can also be any inspection image which is verified as not containing any defective features.

For purpose of providing a well-trained, accurate model that is robust with respect to different variations in actual production, training images must be sufficient in terms of quantity, quality and variance, etc. However, in some cases, such training data can be difficult to collect. For instance, defective training images of the specimens to be examined may be unavailable during the setup phase, or may be very rare and do not include sufficient samples of defective features. In particular, it may be also challenging to acquire corresponding defect-free images as ground truth data which typically takes time and effort.

In some embodiments, in addition to the "real world" training images, the training set used to train the ML model can be enriched by using one or more synthetic images simulated for the semiconductor specimen.

In some cases, at least one of the defective image and/or the defect-free image in a pair can be a simulated image. By way of example, the defect-free image can be simulated based on the design data of the semiconductor specimen. The design data can refer to the original design layout data of the specimen, such as CAD data, as obtained from a customer. Alternatively, the design data can refer to simulated design data generated based on image data of the specimen. By way of example, a SEM image of the specimen can be analyzed and feature extraction can be performed on the SEM image. For instance, the extracted features can include features representative of the structure and/or pattern of the structural elements, such as, e.g., edges, corners, pixel intensities, etc., and optionally one or more measurements with respect to certain structural elements. The extracted features can be used to simulate a design image (e.g., simulated CAD image) corresponding to the SEM image.

Upon obtaining the design data (either original design layout such as CAD or simulated design data) for the specimen, image simulation can be performed based on the design data to simulate one or more effects caused by one or more physical processes of the semiconductor specimen, thereby giving rise to a defect-free image. According to certain embodiments, the effects can refer to variations caused by one or more of the following physical processes: manufacturing/fabrication process of the specimen (e.g., printing the design patterns of the specimen on the wafer by a lithography tool), examination process (e.g., the scanning process and signal processing process by the examination tool), etc. By way of example, effects caused by the fabrication process can be simulated to represent how the design patterns in the design images would actually appear on the wafer. In other words, the simulation transfers the design intent layout to the expected processed pattern on the wafer. In some cases, process variation (PV) can be considered during such simulation. Optionally, gray level (GL) variations caused by the examination process of the tool can be simulated in addition to the effects caused by the fabrication process as described above. Different variations are described below in further detail.

In some embodiments, the defective image can be simulated by synthetically implanting a defective feature on a defect-free image (either an actual defect-free image or a simulated image). Various ways of image augmentation for implanting a synthetic defect on an image based on certain characteristics of the defect, such as, e.g., the type and expected locations etc., can be used, and the present disclosure is not limited to a specific implementation.

Continuing with the description of FIG. 2, the training of the ML model comprises, for each pair of the one or more pairs of training images, processing (204) the defective image by the ML model (e.g., the ML model 108) to obtain a predicted image, and optimizing (206) (e.g., by the training model 106 in PMC 102) the ML model to minimize a difference between the predicted image and the defect-free image.

Figure 4:
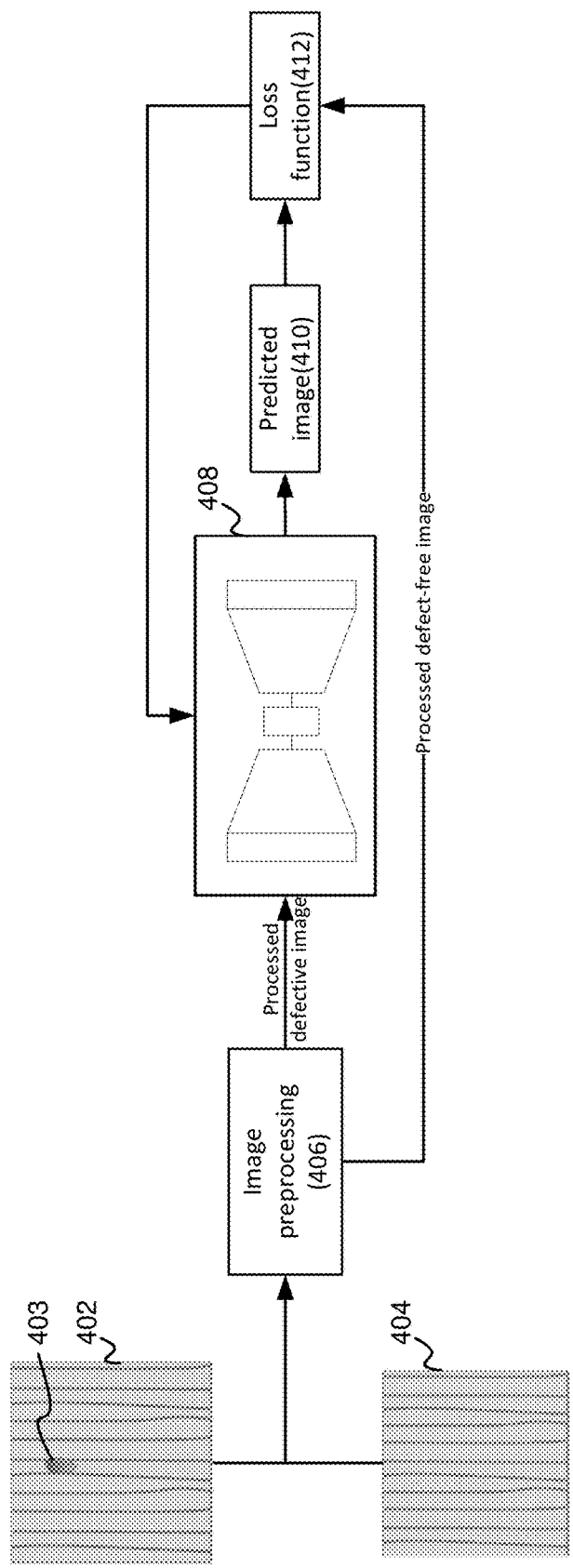
FIG. 4 shows a schematic illustration of an exemplary training process of the ML model in accordance with certain embodiments of the presently disclosed subject matter.

FIG. 4 shows a schematic illustration of an exemplary training process of the ML model in accordance with certain embodiments of the presently disclosed subject matter.

A pair of training images including a defective image 402 and a defect-free image 404 are exemplified. As shown, the defective image 402 comprises a defective feature 403 (such as, e.g., a bridge formed between two line structures). The defect-free image 404 corresponds to the defective image 402 (e.g., it captures an area having similar patterns as of the defective image), and does not comprise any defective feature. In some embodiments, the defective image and the defect-free image in each pair can be pre-processed (406) before being fed to the ML model for training the model (e.g., between the operations descried with reference to blocks 202 and 204 in FIG. 2). The pre-processing can comprise one or more of the following operations: image registration, noise filtration, and image augmentation.

In some embodiments, the pre-processing can comprise image registration between the defective image and the defect-free image in a pair. By way of example, image registration can be performed for purpose of correcting any misalignment between the two images. In some cases, image registration can comprise global registration and/or local registration. The global registration aims to address misalignment caused by various factors, such as, e.g., navigation errors of the tool, drifts caused by certain physical effects such as charging effects and/or by shrinkage of the specimen, etc. The global registration can be implemented according to any suitable registration algorithms known in the art. By way of example, the global registration can be performed by determining a geometric transformation between the two images, such as, e.g., by using affine registration algorithms to determine transformation parameters representative of an affine transformation, including translation, rotation, scaling, shear mapping, etc., and any combination thereof in any sequence. For instance, Phase correlation registration (PCR), as one type of affine registration, can be performed using frequency domain analysis (where phase difference in the Fourier domain is translated into registration in the image domain).

The local registration aims to address misalignment caused by various variations between the images, such as, e.g., process variations. By way of example, in some cases, the registration can be performed using one or more of the following registration algorithms: an area-based algorithm, feature based registration, or phase correlation registration. An example of an area-based method is registration using optical flows such as the Lucas-Kanade (LK) algorithm, or Horn and Schunk algorithm. Feature based methods are based on finding distinct informative points ("features") in two images, and calculating the needed transformation between each pair, based on correspondence of the features. This allows for an elastic registration (i.e., non-rigid registration), where different areas are moved separately.

In some embodiments, the pre-processing can comprise performing noise filtration on the defective image and the defect-free image in a pair for the purpose of reducing noises representative of various variations caused by one or more physical processes of the specimen, such as, e.g., gray level (GL) variations, process variations (PV), etc.

GL variations can be caused by physical effects of the examination process of the specimen. By way of example, gray levels of images taken from different locations of the same wafer can vary. In addition, gray levels of images taken by different examination tools can differ by a factor, even when captured at the same location of the same wafer with the same resolution. In some cases, GL variations can include color variation (CV). Color variation can occur within a single image (e.g., due to layer thickness variations), or between two images, such as an inspection image and a reference image (or a defective image and a corresponding defect-free image). GL variations and CV may be caused by various factors such as, e.g., different physical configurations and calibrations of the examination tools/detectors etc., and can be characterized by local changes of gray level intensities in the images.

In some cases, pattern variations may appear in the two images which may be caused by effects of process variation (PV). Process variation can refer to variations caused by a change in the fabrication process of the specimen. By way of example, the fabrication process may cause slight shifting/scaling/distortion of certain structures/patterns between different inspection images which results in pattern variation in the images. By way of another example, the fabrication process may cause thickness variation of the specimen, which affects reflectivity, thus in turn affecting gray level of the resulting inspection image. For instance, die-to-die material thickness variation can result in a different reflectivity between two of the dies, which leads to a different background gray level value for the images of the two dies.

In some cases, additionally or alternatively, other possible effects of a physical process can include, but not limited to: random noise, focusing errors (e.g., some patterns are more sensitive to focusing errors than others), charging effects (which may create artificial differences between inspection images and reference images, and can substantially affect examination processes), calibration of quad detectors (which may be suboptimal, resulting in images with overlap within different perspectives) etc.

Training a ML model based on the images with such variations may deteriorate generalization capabilities of the ML model, since certain differences that the ML model learns between the defective image and the defect-free image may stem from these variations rather than from actual defective features. The trained ML model may thus suffer from the impact of these variations and provide unstable prediction outputs. The reference images generated by the ML model, when being used for defect detection, may provide a detection result with less optimal detection sensitivity.

For purpose of reducing the impact of these variations, in some embodiments, the defective image and the defect-free image can be pre-processed to filter noises representative of one or more of the above variations. By way of example, one type of such noises, which represents background gray level variations between the two images, can be estimated, e.g., by modelling a systematic transformation of pixel values from one image to the other. For instance, the transformation can be represented by a polynomial relation between the pixel values of the two images. By way of another example, another type of noises, which represents pattern variations, can be estimated, e.g., by modelling a spatial shift/scaling between the pixel values constituting the patterns in the two images. Other ways of noise filtration can be performed on the two images, in addition to or in lieu of the above. Such image pre-processing enables increased robustness of the trained ML model to different variations in runtime images.

In some further embodiments, the pre-processing can comprise performing image augmentation on the defective image and the defect-free image in a pair. By way of example, the image augmentation can be performed using inpainting techniques. Image inpainting refers to reconstructing missing parts of an image. For instance, a defective image can be split into a set of sub-regions in the size of n*n pixels using a grid. The set of sub-regions is then randomly split into m disjoint subsets. For each subset, the sub-regions belonging to that subset are removed from the defective image, thereby resulting in m defective sub-images, each with a removed subset of sub-regions.

Therefore, each defective image is converted to m defective sub-image corresponding to respective portions of the defect-free image, thereby enriching the training set in terms of the number of input images processed by the ML model. For each defective sub-image, the ML model works as an inpainting network to reconstruct the removed sub-regions in the defective sub-image, giving rise to an output sub-image containing reconstructed sub-regions which were missing in the corresponding input defective sub-image. By processing the m defective sub-images, the ML model will generate m reconstructed sub-images. The m reconstructed sub-images can be assembled into a single reconstructed image. The reconstructed image will be evaluated with respect to the defect-free image.

It is to be noted that in some cases the image preprocessing can include at least one of the image registration, noise filtration or image augmentation as described above. For instance, the image preprocessing can include both image registration and noise filtration. In some other cases, the image preprocessing can possibly include all the three types of preprocessing operations which can be performed in any suitable order, such as, e.g., image registration followed by noise filtration and then image augmentation.

After the image preprocessing 406, the processed defective image is fed into the ML model 408 to be processed. The output of the ML model 408 is a predicted image 410. The predicted image 410 is evaluated with respect to the processed defect-free image (which serves as ground truth data for the predicted image) using a loss function 412 (also referred to as cost function). The loss function 412 can be a difference metric configured to represent a difference between the predicted image and the defect-free image. The ML model 408 can be optimized by minimizing the value of the loss function 412. By way of example, the ML model 408 can be optimized using a loss function such as, e.g., Mean squared error (MSE), Sum of absolute difference (SAD), structural similarity index measure (SSIM), or an edge-preserving loss function. It is to be noted that the term "minimize" or "minimizing" used herein refers to an attempt to reduce a difference value represented by the loss function to a certain level/extent (which can be predefined), but not necessarily have to reach the actual minimum.

As described above, the ML model can be implemented as various supervised learning models. In one example, the ML model can be implemented as a convolutional neural network (CNN). CNN normally has a structure comprising an input and an output layer, as well as multiple hidden layers. The hidden layers of a CNN typically comprise a series of convolutional layers that convolve with a multiplication or other dot product, subsequently followed by additional layers such as pooling layers, fully connected layers, and normalization layers, etc. In some cases, a CNN can be regarded as being composed of two main functionalities: feature extraction and classification. By way of example, the feature extraction part can include several convolutional layers followed by max-pooling and an activation function. The classification part usually includes fully connected layers. By way of example, in some cases, certain intermediate layers (e.g., one or more of the convolutional layers) in the feature extraction part of the supervised model can provide layer output in the form of feature maps (also termed as feature vectors). For instance, the output feature maps can be generated, e.g., by convolving each filter of a specific layer across the width and height of the input feature maps, computing the dot product between the entries of the filter and the input, and producing a two-dimensional activation map which gives the responses of that filter at every spatial position. Stacking the activation maps for all filters along the depth dimension forms the full output feature maps of the convolution layer. As a result, the CNN learns of filters that activate when it detects some specific type of feature at some spatial position in the input.

Training of the CNN can be performed by iteratively adjusting the weights and/or threshold values of the CNN using back propagation during each epoch, so that the prediction matches the ground truth (i.e., the loss function is minimized to a certain level/threshold). After the weight adjustment in each epoch, the CNN improves in terms of prediction accuracy, and eventually it achieves an optimal set of weights in a trained model meeting the performance requirements.

In cases where the defective image is pre-processed by image augmentation, such as by using inpainting techniques, as described above, the CNN acts as an inpainting network. The m reconstructed sub-images as outputted by the CNN can be assembled into a single reconstructed image. The reconstructed image will be evaluated with respect to the defect-free image. Using an inpainting network in such cases can benefit from the proved ability of the inpainting network for predicting normal patterns, improve the prediction performance of the trained ML model for predicting defect-free reference images, and enhance the robustness of the trained ML model with respect to various defective features.

In some embodiments, the functionalities of the pre-processing operations as described above, such as image registration, noise filtration, etc., can be at least partially implemented as part of the ML model. By way of example, the ML model can comprise one or more learning modules (e.g., as pre-CNN modules or pre-DNN modules) configured to perform image registration and/or noise filtration on the defective image and the defect-free image in a pair. In such cases, the ML model can be regarded as a network ensemble which comprises a registration learning module and/or a noise filtration learning module preceding a CNN module.

For instance, the registration learning module can be trained together with or separately from the CNN, using the original training image pairs of defective image and defect-free images as input, and corresponding registered image pairs thereof as ground truth. Similarly, the noise filtration learning module can also be trained together with or separately from the CNN, using at least one of the defective image and defect-free images as input, and at least one corresponding image with reduced noises as ground truth. The present disclosure is not limited to a specific implementation of such functionalities, either as pre-processing modules or as part of the ML model.

The preprocessing of the training image pairs, either implemented as a separate pre-processing module preceding the ML model, or as an inherent part of the ML model itself, enables image registration and/or noise filtration between the image pair, thus eliminating the impact of these variations on the trained ML model. The reference image as predicted by the ML model is supposed to have improved alignment with the runtime image, and share similar noise levels as of the runtime image. Using a reference image generated as such for runtime defect examination can reduce image pre-processing efforts such as image registration and noise filtration, as previously required for processing a runtime image and a separately acquired reference image which possesses inherent misalignment and variations. For instance, in many cases, the generated reference image can be used to directly compare with the runtime image, without being pre-preprocessed for purpose of image registration and/or noise filtration with respect to the runtime image. Using such a generated reference image in defect examination not only improves defect detection throughput, but also increases detection sensitivity (in terms of higher capture rate and lower false alarm rate).

Once the ML model is trained, it can be tested and validated using additional datasets. If the prediction performance during test and validation meets the requirements, the trained ML model can be then deployed in runtime for defect examination.

Turning now to FIG. 3, there is illustrated a generalized flowchart of runtime defect examination using a machine learning model trained for generating a reference image in accordance with certain embodiments of the presently disclosed subject matter.

A runtime image of a semiconductor specimen can be obtained (302) (e.g., by the examination tool 120) during runtime examination of the specimen.

The runtime image can be provided as an input to a machine learning model (e.g., the ML model 108 in PMC 102) to process. A reference image can be generated (304), as an output of the ML model, based on the runtime image. The ML model is previously trained during setup using a training set comprising one or more pairs of training images, each pair including a defective image and a corresponding defect-free image, as described above with reference to FIGS. 2 and 4. As described above, the ML model can be implemented using various learning models.

Defect examination can be performed (306) (e.g., by the defect examination module 110 in PMC 102) on the runtime image using the generated reference image. As described above, the generated reference image is supposedly aligned with the runtime image and shares similar noise levels as of the runtime image. The defect examination can be performed by directly comparing the runtime image with the generated reference image (without pre-processing such as registration and noise filtration) to obtain a defect examination result indicative of defect distribution on the semiconductor specimen. The defect examination can refer to one or more of the following operations: defect detection, defect review, and defect classification.

As described above, defect detection refers to capturing inspection images of a specimen and detecting potential defects based on the images in accordance with a defect detection algorithm, such as, e.g., in D2D inspection. For each inspection image, the trained ML model can process it and generate a corresponding reference image. The reference image can be used to be compared with the inspection image, giving rise to a defect map indicative of defect candidate distribution on the semiconductor specimen. In some cases, a list of defect candidates can be further selected from the defect map as candidates having higher probability to be defects of interest (DOI).

After defect detection, the defect candidates can be provided to a defect review tool (such as, e.g., ADR). The review tool is configured to capture review images (typically with higher resolution) at locations of the respective defect candidates, and review the review images for ascertaining whether a defect candidate is indeed a DOI. Similarly, in such cases, the trained ML model can be used to process a review image and generate a corresponding reference image. The reference image can be used to be compared with the review image. The output of the review tool can include label data respectively associated with the defect candidates, the label data informative of whether each defect candidate is a DOI.

In some cases, a defect classification tool (such as, e.g., ADC) is used in addition to the defect review (DR) tool or in lieu of the DR tool. By way of example, the classification tool can provide label data informative of whether each defect candidate is a DOI, and for those labelled as DOI, also the classes or the types of the DOIs. The trained ML model can be used here in a similar manner.

Figure 5:
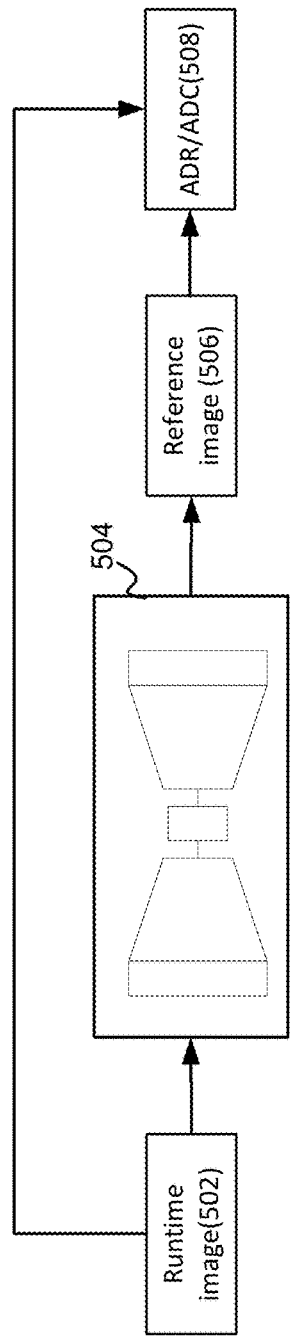
FIG. 5 shows a schematic illustration of an exemplary runtime examination process using a trained ML model in accordance with certain embodiments of the presently disclosed subject matter.

FIG. 5 shows a schematic illustration of an exemplary runtime examination process using a trained ML model in accordance with certain embodiments of the presently disclosed subject matter. A runtime image 502 of a specimen is acquired by an inspection tool. The runtime image 502 is fed into a trained ML model 504 to be processed. The ML model 504 has been previously trained in accordance with the description of FIGS. 2 and 4. Upon processing the image 502, the ML model 504 provides a reference image 506 as an output. The runtime image 502, together with the reference image 506, are provided to a defect examination module, such as the exemplary ADR/ADC module 508, for purpose of defect examination on the specimen.

According to certain embodiments, alternatively, the ML model can be trained based on unsupervised learning. Unsupervised learning generally refers to learning patterns from unlabeled data. In unsupervised learning, the ML model will learn to identify patterns from unsorted information according to similarities and differences, even though there are no categories or labels provided. The ML model can be implemented as various models, such as, e.g., autoencoder (AE), Variational autoencoder (VAE), generative adversarial network (GAN), and Vision Transformer (ViT), with unsupervised learning mode.

For training a ML model in unsupervised learning, a training set without labeling can be provided. According to certain embodiments of the present disclosure, a training set can be generated (e.g., by the training set generator 104 in PMC 102), comprising a plurality of defect-free images. As described above, a defect-free image refers to a clean image free of defective features, or has a high probability of not comprising any defective features. The defect-free images can be collected from "real-world" images of the specimen, or alternatively, at least part of the images can be simulated based on design data of the specimen, as described above.

By way of example, in unsupervised learning, the ML model can be implemented as an autoencoder (AE) or variations thereof (e.g., VAE). Autoencoder is a type of neural network commonly used for the purpose of data reproduction by learning efficient data coding and reconstructing its inputs (e.g., minimizing the difference between the input and the output). The autoencoder has an input layer, an output layer, and one or more hidden layers connecting them. Generally, an autoencoder can be regarded as including two parts, the encoder and the decoder. The autoencoder learns to compress data from an input layer into a short code (i.e., the encoder part), and then decompress that code into an output that closely matches the original data (i.e., the decoder part). The output of the encoder is referred to as code, latent variables, or latent representation representative of the input image. The code can pass the hidden layers in the decoder and can be reconstructed to an output image corresponding to the input image in the output layer.

For each input defect-free image in the training set, the autoencoder can extract features representative of the input image, and use the representative features to reconstruct a corresponding output image which can be evaluated by comparing with the input image. The autoencoder is trained and optimized so as to learn the representative features in the input training images (e.g., the features can be representative of, e.g., structural elements, patterns, pixel distribution, etc., in the training images). As the training images are defect-free images, the autoencoder is trained to learn the distribution of normal patterns and characteristics of defect-free images.

Once the autoencoder is trained based on the training set, the trained autoencoder is capable of generating, for each runtime image, a reconstructed output image that closely matches the input based on the latent representation thereof. As the autoencoder is trained with only defect-free images, it will not be able to reconstruct anomaly patterns (defective patterns) that were not observed during training. In cases where the runtime image is a defective image, the autoencoder will reconstruct a corresponding defect-free image of the defective image. Therefore, the trained autoencoder can be used in runtime for generating a reference image for a runtime image.

In some cases, however, certain autoencoders may present a high generalization capability, therefore may anyhow reconstruct some of the defective features in the output image. This violates the above assumption and makes the defective features indistinguishable from defect-free features when using the generated reference image for purpose of defect examination.

In such cases, the inpainting technique as described above can be used for image reconstruction. Image inpainting refers to reconstructing missing parts of an image. For instance, a defect-free image can be split into a set of sub-regions in the size of n*n pixels using a grid. The set of sub-regions is then randomly split into m disjoint subsets. For each subset, the sub-regions belonging to that subset are removed from the defect-free image, thereby resulting in m defect-free sub-images, each with a removed subset of sub-regions.

For each defect-free sub-image, the ML model works as an inpainting network to reconstruct the removed sub-regions therein, giving rise to an output sub-image containing reconstructed sub-regions which were missing in the corresponding input sub-image. The missing sub-regions are reconstructed based only on their immediate neighborhood pixels, excluding the original pixels in these regions. Therefore, the likelihood of reconstructing a defective feature by generalizing its neighborhood appearance (which contains normal features) is very low. In addition, as the ML model is trained using only defect-free images, the reconstruction of defect-free regions is modelled very well. Therefore, using inpainting network can improve the reconstruction performance of normal patterns, thereby increasing the detection ability of defective features using the reconstructed images.

As recognized, defects on semiconductor specimens have different characteristics with respect to typical anomalies on objects. For instance, the defects are typically small in size, and may often present similar appearance as of normal patterns. In some cases, even by using the inpainting network as described above, some of the defects may still be reconstructed (e.g., a defective feature may not be entirely removed when randomly splitting an image into sub-images with removed sub-regions) by the network, thus affecting the defect detection stability and accuracy.

In comparison, training the ML model in supervised learning using training image pairs of defective image and defect-free image, as described above with respect to FIGS. 2 and 4, enables the ML model to learn and sort based on provided ground truth data, thus allowing the accuracy of supervised learning outputs to be verified in a way that unsupervised learning cannot be measured. The proposed supervised learning using the specifically configured training set can ensure the accuracy and stability of the prediction performance, thus generating a satisfying reference image usable to enhance the downstream defect examination.

On the other hand, unsupervised learning can identify previously unknown patterns in data. It can be easier, faster, and less costly to use than supervised learning, as unsupervised learning does not require associating training inputs with label data that supervised learning requires, which in some cases can be very difficult to achieve. For instance, defective images are relatively rare as compared to defect-free images. Using only defect-free images as training data can make data preparation much easier, as compared to preparing image pairs comprising corresponding defective and defect-free images.

It is to be noted that the above examples of CNN, autoencoder or inpainting network are described for exemplary and illustrative purposes only, and should not be regarded as limiting the present disclosure in any way. Other types of supervised and unsupervised models can be used in addition to or in lieu of the above.

It is to be noted that examples illustrated in the present disclosure, such as, e.g., the preprocessing techniques, the exemplified algorithms for image registration, noise filtration and/or image augmentation, the exemplified image simulation techniques etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein is that, instead of additional image acquisition of an actual reference image, there is provided a machine learning model capable of generating a synthetic reference image for a runtime image, and using the generated reference image to perform defect examination operations. The proposed system significantly reduces the image acquisition time of the examination tool.

In addition, the preprocessing of the training image pairs, either implemented as a separate pre-processing module preceding the ML model, or as an inherent part of the ML model itself, enables image registration and/or noise filtration between the image pair. The reference image as predicted by the ML model is supposed to have improved alignment with the runtime image, and share similar noise levels as of the runtime image. Using a reference image generated as such can reduce image pre-processing efforts as previously required for processing a runtime image, and a separately acquired reference image which possesses inherent misalignment and variations. Using such a generated reference image in defect examination not only improves defect detection throughput, but also increases detection sensitivity.

Among further advantages of certain embodiments of the presently disclosed subject matter as described herein is training the ML model in supervised learning using specifically configured training image pairs of defective image and defect-free image, which ensures the accuracy and stability of the prediction performance of the model, thus providing a satisfying reference image usable to enhance the downstream defect examination.

Among further advantages of certain embodiments of the presently disclosed subject matter as described herein is generating sufficient training data for training the ML model, including simulated defective images and/or defect-free images. The image simulation can take into consideration one or more effects/variations caused by one or more physical process such as the fabrication process and/or examination process of the specimen, thus increasing the variety of the training data with controlled amount of variance.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system for defect examination on a semiconductor specimen, the system comprising a processing and memory circuitry (PMC) configured to:
   obtain a runtime image of the semiconductor specimen;
   generate a reference image based on the runtime image using a machine learning (ML) model, wherein the ML model is previously trained during setup using a training set comprising one or more pairs of training images, each pair including a defective image and a corresponding defect-free image, the training comprising, for each pair:
      processing the defective image by the ML model to obtain a predicted image; and
      optimizing the ML model to minimize a difference between the predicted image and the defect-free image,
      wherein the defective image and the defect-free image in each pair are pre-processed before the training by performing image augmentation on the defective image and the defect-free image using inpainting, giving rise to multiple defective sub-images corresponding to respective portions of the defect-free image, and wherein each defective sub-image has a removed subset of sub-regions, and the ML model works as an inpainting network to reconstruct the removed subset of sub-regions in the defective sub-image; and perform defect examination on the runtime image using the generated reference image.

2. The computerized system according to claim 1, wherein the ML model is a deep neural network (DNN) configured to learn non-linear mapping between two populations of defective images and defect-free images.

3. The computerized system according to claim 1, wherein the defective image in each pair is one of: an actual image of the semiconductor specimen acquired by an examination tool and verified as containing a defective feature, or a simulated image by synthetically implanting a defective feature on a defect-free image, and wherein the corresponding defect-free image in each pair is one of: an actual image of the semiconductor specimen acquired by an examination tool and verified as not containing a defective feature, or a simulated image generated based on design data of the semiconductor specimen.

4. The computerized system according to claim 1, wherein the defective image and the defect-free image in each pair are pre-processed before the training by registering the defective image and the defect-free image to correct misalignment therebetween.

5. The computerized system according to claim 1, wherein the defective image and the defect-free image in each pair are pre-processed before the training by performing noise filtration on the defective image and the defect-free image to reduce noises representative of variations caused by one or more physical processes of the specimen.

6. The computerized system according to claim 1, wherein the defective image and the defect-free image in each pair are pre-processed before the training by performing image registration, noise filtration and image augmentation on the defective image and the defect-free image.

7. The computerized system according to claim 1, wherein the ML model comprises at least one learning module preceding a DNN, the at least one learning module trained to perform at least one of image registration and noise filtration on the defective image and the defect-free image in each pair before being processed by the DNN.

8. The computerized system according to claim 1, wherein the ML model is optimized using a loss function selected from: Mean squared error (MSE), Sum of absolute difference (SAD), structural similarity index measure (SSIM), and an edge-preserving loss function.

9. The computerized system according to claim 1, wherein the defect examination is one of: defect detection, defect review, and defect classification.

10. The computerized system according to claim 1, wherein the generated reference image has improved alignment with the runtime image and shares similar noise levels as of the runtime image, and the PMC is configured to perform defect examination by directly comparing the runtime image with the generated reference image to obtain a defect examination result indicative of defect distribution on the semiconductor specimen.

11. A computerized method of defect examination on a semiconductor specimen, the method comprising:
obtaining a runtime image of the semiconductor specimen;
generating a reference image based on the runtime image using a machine learning (ML) model, wherein the ML model is previously trained during setup using a training set comprising one or more pairs of training images, each pair including a defective image and a corresponding defect-free image, the training comprising, for each pair:
processing the defective image by the ML model to obtain a predicted image; and
optimizing the ML model to minimize a difference between the predicted image and the defect-free image,
wherein the defective image and the defect-free image in each pair are pre-processed before the training by performing image augmentation on the defective image and the defect-free image using inpainting, giving rise to multiple defective sub-images corresponding to respective portions of the defect-free image, and wherein each defective sub-image has a removed subset of sub-regions, and the ML model works as an inpainting network to reconstruct the removed subset of sub-regions in the defective sub-image; and
performing defect examination on the runtime image using the generated reference image.

12. The computerized method according to claim 11, wherein the defective image in each pair is one of: an actual image of the semiconductor specimen acquired by an examination tool and verified as containing a defective feature, or a simulated image by synthetically implanting a defective feature on a defect-free image, and wherein the corresponding defect-free image in each pair is one of: an actual image of the semiconductor specimen acquired by an examination tool and verified as not containing a defective feature, or a simulated image generated based on design data of the semiconductor specimen.

13. The computerized method according to claim 11, wherein the defective image and the defect-free image in each pair are pre-processed before the training by registering the defective image and the defect-free image to correct misalignment therebetween.

14. The computerized method according to claim 11, wherein the defective image and the defect-free image in each pair are pre-processed before the training by performing noise filtration on the defective image and the defect-free image to reduce noises representative of variations caused by one or more physical processes of the specimen.

15. The computerized method according to claim 11, wherein the ML model comprises at least one learning module preceding a DNN, the at least one learning module trained to perform at least one of image registration and noise filtration on the defective image and the defect-free image in each pair before being processed by the DNN.

16. The computerized method according to claim 11, wherein the defect examination is one of: defect detection, defect review, and defect classification.

17. The computerized method according to claim 11, wherein the generated reference image has improved alignment with the runtime image and shares similar noise levels as of the runtime image, and the performing defect examination comprises directly comparing the runtime image with the generated reference image to obtain a defect examination result indicative of defect distribution on the semiconductor specimen.

18. A non-transitory computer readable storage medium tangibly embodying a program of instructions that, when executed by a computer, cause the computer to perform a method of defect examination on a semiconductor specimen, the method comprising:
obtaining a runtime image of the semiconductor specimen;
generating a reference image based on the runtime image using a machine learning (ML) model, wherein the ML model is previously trained during setup using a training set comprising one or more pairs of training images, each pair including a defective image and a corresponding defect-free image, the training comprising, for each pair:
processing the defective image by the ML model to obtain a predicted image; and
optimizing the ML model to minimize a difference between the predicted image and the defect-free image,
wherein the defective image and the defect-free image in each pair are pre-processed before the training by performing image augmentation on the defective image and the defect-free image using inpainting, giving rise to multiple defective sub-images corresponding to respective portions of the defect-free image, and wherein each defective sub-image has a removed subset of sub-regions, and the ML model works as an inpainting network to reconstruct the removed subset of sub-regions in the defective sub-image; and
performing defect examination on the runtime image using the generated reference image.

* * * * *